(12) United States Patent
Nakajima et al.

(10) Patent No.: US 7,735,757 B2
(45) Date of Patent: Jun. 15, 2010

(54) GASEOUS FUEL INJECTION VALVE

(75) Inventors: Yoji Nakajima, Miyagi (JP); Naoto Takiguchi, Miyagi (JP); Takashi Yoshida, Miyagi (JP)

(73) Assignee: Keihin Corporation, Tokyo (JP)

( * ) Notice: Subject to any disclaimer, the term of this patent is extended or adjusted under 35 U.S.C. 154(b) by 291 days.

(21) Appl. No.: 11/498,256

(22) Filed: Aug. 3, 2006

(65) Prior Publication Data
US 2007/0029413 A1 Feb. 8, 2007

(30) Foreign Application Priority Data
Aug. 4, 2005 (JP) ............... 2005-227115

(51) Int. Cl.
*F02M 59/00* (2006.01)
*F02M 61/00* (2006.01)
*F02M 63/00* (2006.01)
*B05B 1/30* (2006.01)

(52) U.S. Cl. .................. 239/533.2; 239/88; 239/90; 239/91; 239/585.1

(58) Field of Classification Search . 239/533.2–533.12, 239/88–92, 5
See application file for complete search history.

(56) References Cited

U.S. PATENT DOCUMENTS

| | | | |
|---|---|---|---|
| 3,479,007 A | 11/1969 | Buell | |
| 6,305,346 B1 | 10/2001 | Ueda et al. | |
| 6,325,853 B1 * | 12/2001 | Hogan et al. | 118/300 |
| 6,336,621 B1 | 1/2002 | Ii et al. | |
| 6,851,630 B2 * | 2/2005 | Nagaoka et al. | 239/585.1 |
| 6,857,417 B2 * | 2/2005 | Niwa | 123/467 |
| 6,978,950 B2 * | 12/2005 | Bierstaker et al. | 239/585.1 |
| 6,991,219 B2 * | 1/2006 | Aharonov et al. | 251/368 |
| 7,157,168 B2 * | 1/2007 | Nakajima et al. | 429/22 |
| 2005/0242212 A1 * | 11/2005 | Chapaton et al. | 239/533.12 |

FOREIGN PATENT DOCUMENTS

| | | |
|---|---|---|
| EP | 1 300 586 A2 | 4/2003 |
| JP | 07-229578 A | 8/1995 |
| JP | 8-28360 A | 1/1996 |
| JP | 11-062710 A | 3/1999 |
| JP | 2001-107805 A | 4/2001 |
| JP | 2004-068671 A | 3/2004 |

* cited by examiner

*Primary Examiner*—Len Tran
*Assistant Examiner*—James S Hogan
(74) *Attorney, Agent, or Firm*—Arent Fox LLP

(57) ABSTRACT

A gaseous fuel injection valve includes: a valve housing; a metallic nozzle member having a flat valve seat and a nozzle bore passing through a central portion of the valve seat; a valve body provided at one end face with a rubber seating member which is operated in cooperation with the valve seat; a coil; and a return spring for urging a stationary core and the valve body toward the valve seat. The stationary core attracts the valve body to move the seating member away from the valve seat, when the coil is excited. In this injection valve, a fluorine resin valve seat coating is formed on the valve seat so that the seating member is brought into close contact with the valve seat coating. Thus, an oil-repellent property of the valve seat coating is provided to the valve seat to prevent adherence of oil to the valve seat, leading to an improvement in valve-opening response of the valve body upon the excitation of the coil.

14 Claims, 9 Drawing Sheets

GASEOUS FUEL INJECTION VALVE

RELATED APPLICATION DATA

The present invention is based upon Japanese priority application No. 2005-227115, which is hereby incorporated in its entirety herein by reference.

BACKGROUND OF THE INVENTION

1. Field of the Invention

The present invention relates to a gaseous fuel injection valve for supplying a natural gas such as CNG and LPG as a fuel to an internal combustion engine, and particularly to an improvement in a gaseous fuel injection valve, comprising: a valve housing; a metallic nozzle member which is fixedly mounted at one end of the valve housing and which has a flat valve seat and a nozzle bore passing through a central portion of the valve seat; a valve body which is slidably fitted in the valve housing and which is provided at one end face with a rubber seating member for opening and closing the nozzle bore in cooperation with the valve seat; a coil supported in the valve housing; a stationary core which is connected to the valve housing and disposed inside the coil to be opposed the other end face of the valve body; and a return spring mounted under compression between the stationary core and the valve body so as to urge the valve body toward the valve seat, the stationary core attracting the valve body to move the seating member away from the valve seat when the coil is excited.

2. Description of the Related Art

Such a gaseous fuel injection valve is already known as disclosed in Japanese Patent Application Laid-open No. 8-28360.

Conventionally, in a fuel tank of a fuel supply system for an internal combustion engine using a natural gas as a fuel, a gaseous fuel charged in a fuel tank contains a small amount of a lubricating oil to be applied to various devices for a gaseous fuel supply source. Therefore, a small amount of the oil is also incorporated in the fuel supplied from the fuel tank to an injection valve. In the conventional gaseous fuel injection valve, if the oil is adhered to a flat valve seat, the oil induces a sucker effect in a valve seat with respect to a seating member upon seating of the valve body on the valve seat, particularly in a cold season in which the viscosity of oil is increased. Therefore, when the coil is excited, the sucker effect may provide a resisting force against the movement of the seating member away from the valve seat, resulting in a reduction in valve-opening response of the valve body.

SUMMARY OF THE INVENTION

Accordingly, it is an object of the present invention to provide a gaseous fuel injection valve wherein an oil-repellent property is provided to a valve seat to prevent adherence of oil to a valve seat, leading to an improvement in valve-opening response of the valve seat, and moreover the need for a high-accuracy machining of the valve seat is eliminated to contribute to a reduction in the cost.

In order to achieve the above object, according to a first feature of the present invention, there is provided a gaseous fuel injection valve, comprising: a valve housing; a metallic nozzle member which is fixedly mounted at one end of the valve housing and which has a flat valve seat and a nozzle bore passing through a central portion of the valve seat; a valve body which is slidably fitted in the valve housing and which is provided at one end face with a rubber seating member for opening and closing the nozzle bore in cooperation with the valve seat; a coil supported in the valve housing; a stationary core which is connected to the valve housing and disposed inside the coil to be opposed the other end face of the valve body; and a return spring mounted under compression between the stationary core and the valve body so as to urge the valve body toward the valve seat, the stationary core attracting the valve body to move the seating member away from the valve seat when the coil is excited, wherein a fluorine resin valve seat coating is formed on the valve seat so that the seating member is brought into close contact with the valve seat coating.

With the first feature of the present invention, the fluorine resin valve seat coating formed on the valve seat can exhibit the oil-repellent effect to prevent the adherence of the oil to the valve seat, thereby preventing the sticking of the seating member to the valve seat due to the adherent oil even in a cold season, leading to an improvement in valve-opening response of the valve body.

Moreover, the surface of the valve seat coating is remarkably smooth, and hence a high-accuracy finishing for the valve seat is not required, thereby providing a reduction in the manufacturing cost.

According to second feature of the present invention, in addition to the first feature, an annular rubber cushion member having a plurality of circumferentially arranged notches is baked to a surface of the valve body opposed to the stationary core, and a fluorine resin coating is formed on a surface of the stationary core opposed to the valve body so that the cushion member is brought into abutment against the coating when the coil is excited.

With the second feature of the present invention, during opening of the valve body, the opening motion of the valve body is stopped in a buffering manner by the abutment of the annular rubber cushion member of the valve body against the stationary core. Therefore, it is possible to prevent the generation of noise, and to moderate the impact force on the valve body and the stationary core thereby increasing the durability thereof.

Moreover, because the plurality of notches are provided in the cushion member, the sucker effect of the cushion member due to the adherent oil can be detracted during the opening of the valve body to effectively prevent the sticking of the cushion member to the stationary core, thereby providing an improvement in valve-opening response of the valve body.

Further, because the fluorine resin coating is formed on the front end face of the stationary core against which the cushion member abuts, the coating exhibits the oil-repellent effect against the oil in the gaseous fuel, thereby further improving the valve-opening response of the valve body.

According to a third feature of the present invention, in addition to the second feature, surfaces of the seating member and the cushion member of the valve body are formed to be satin finished surfaces.

With the third feature of the present invention, because the surfaces of the seating member and the cushion member are formed to be the satin finished surfaces, the sucker effect of the seating member and the cushion member due to the adherent oil can be detracted to more effectively prevent the sticking of the seating member to the valve seat and the sticking of the cushion member to the stationary core, thereby providing an improvement in valve-opening response of the valve body.

According to a fourth feature of the present invention, in addition to the first or second feature, a pair of journal portions are formed at axially opposite ends of the valve body; an intermediate portion between the journal portions is formed to be a long shaft portion having a diameter smaller than those of the journal portions; and the valve housing is provided with a guide bore in which the journal portions are slidably supported.

With the fourth feature of the present invention, the areas of contact of the journal portions with the inner peripheral surface of the guide bore are remarkably decreased, as compared with a case where a journal portion is formed over the entire length of the valve seat. Thus, it is possible to decrease sliding clearances between the journal portions and the inner peripheral surface of the guide bore thereby stabilizing the attitude of the valve body, and to prevent the oil in the gaseous fuel from entering the sliding clearances to the utmost, thereby providing an improvement in valve-opening response of the valve body.

According to a fifth feature of the present invention, in addition to the fourth feature, a fluorine resin coating is formed on at least one of outer peripheral surface of each of the first and second journal portions, and an inner peripheral surface of the guide bore.

With the fifth feature of the present invention, the fluorine resin coating is formed in either one or both of an outer peripheral surface of each of the journal portions and the inner peripheral surface of the guide bore, and exhibits the oil-repellent effect, thereby removing the oil penetrating into the sliding clearances. As a result, it is possible to prevent an increase in resistance to the sliding of the first and second journal portions due to the penetrating oil, thereby providing an improvement in operating response of the valve body.

The above and other objects, features and advantages of the invention will become apparent from the following description of the preferred embodiments taken in conjunction with the accompanying drawings.

DETAILED DESCRIPTION OF PREFERRED EMBODIMENTS

First, a first embodiment of the present invention will now be described with reference to FIGS. 1 to 8.

Figure 1:
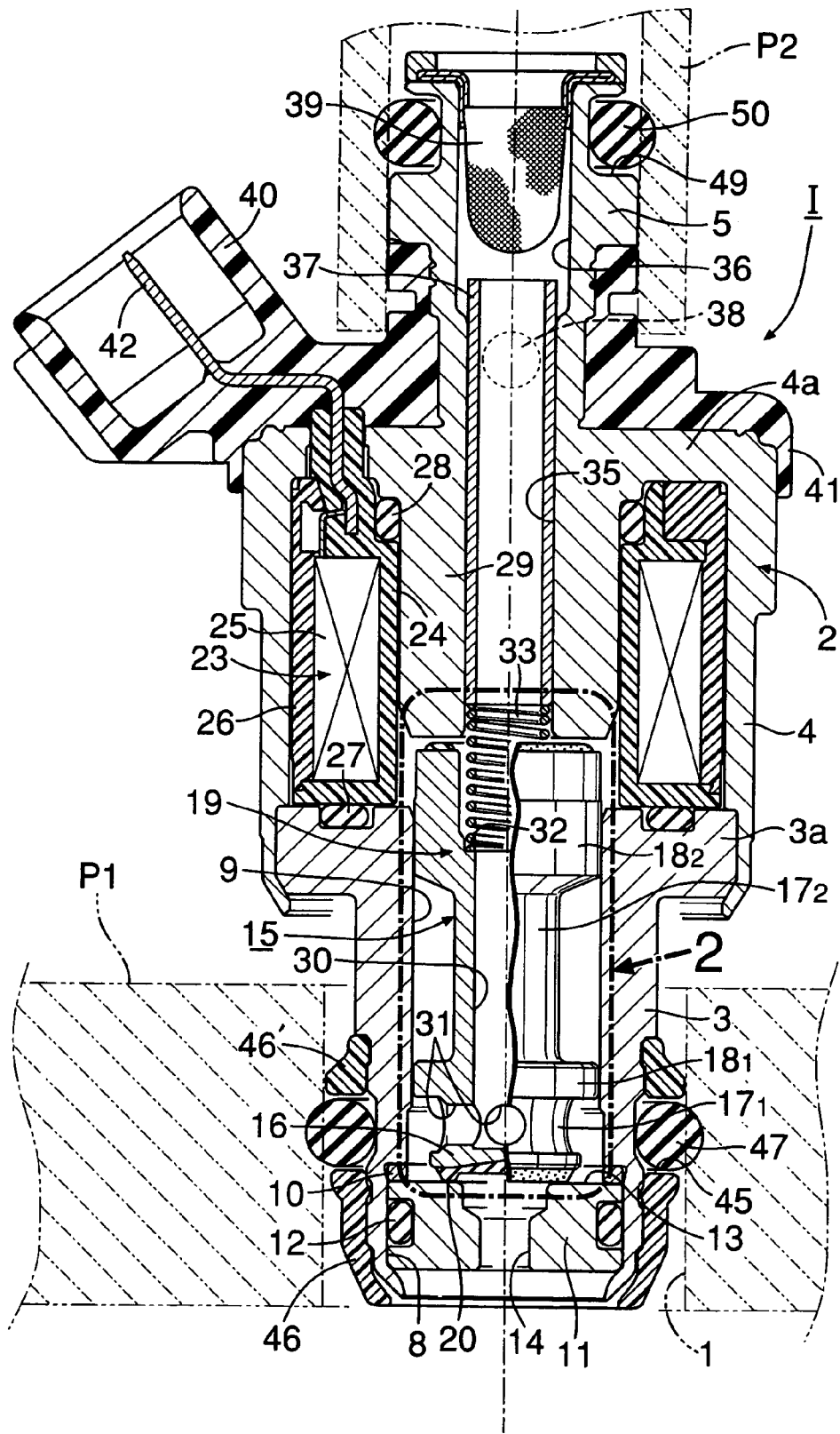
FIG. 1 is a vertical sectional view of a gaseous fuel injection valve according to a first embodiment of the present invention.
Figure 2:
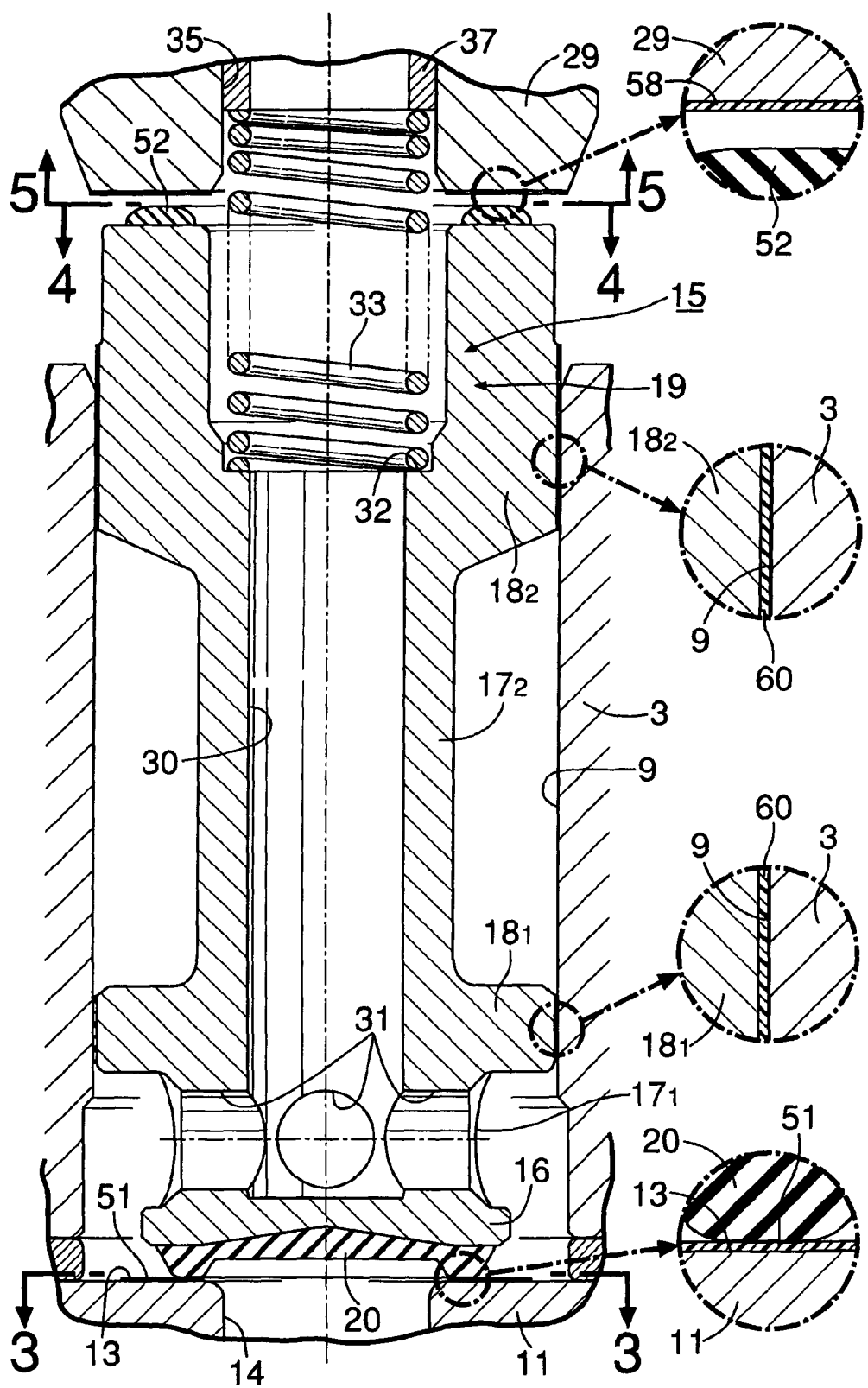
FIG. 2 is an enlarged view of Part 2 in FIG. 1.

Referring to FIGS. 1 and 2, a gaseous fuel injection valve I according to the present invention has a front end mounted in a mounting bore 1 provided in a wall of an intake pipe P1 of an engine, so that the gaseous fuel can be injected into the intake pipe P1 during an intake stroke of the engine. The injection valve I includes a valve housing 2 which comprises: a first cylindrical housing portion 3; a second cylindrical housing portion 4 connected by crimping at its front end to a flange 3a at a rear end of the first housing portion 3 and having a diameter larger than that of the first housing portion 3; and a third cylindrical housing portion 5 integrally connected to a rear end wall of the second housing portion 4 and having a diameter smaller than that of the second housing portion 4. All the first, second and third housing portions 3, 4 and 5 are formed of a magnetic material.

The first housing portion 3 has a mounting bore 8 opening at its front end, and a guide bore 9 opening at its rear end and having a diameter and a length larger than those of the mounting bore 8. The mounting bore 8 and the guide bore 9 are coaxially formed in the first housing portion 3. An annular shim 10 and a disk-shaped nozzle member 11 are sequentially fitted into the mounting bore 8 and secured thereto by crimping inward a front end edge of the first housing portion 3. At this time, an annular seal member 12 is mounted around an outer periphery of the nozzle member 11 to come into close contact with an inner peripheral surface of the mounting bore 8. The annular shim 10 is adapted to regulate the fitting position of the nozzle member 11 by the selection of a thickness of the annular shim 10.

On the other hand, a valve body 15 is slidably accommodated and retained in the guide bore 9. The valve body 15 comprises a plunger 19 and a seating member 20. The plunger 19 is formed by integrally coaxially connecting, sequentially from a front end, a flange portion 16, a short shaft portion $17_1$, a first journal portion $18_1$, a long shaft portion $17_2$ and a second journal portion $18_2$. The seating member 20 is made of a rubber and connected by baking to a front end face of the flange portion 16. A nozzle bore 14 can be opened and closed by moving the seating member 20 toward and away from a valve seat 13. The plunger 19 is made of a magnetic material so as to serve as a movable core.

In the plunger 19, the short shaft portion $17_1$, and the long shaft portion $17_2$ are formed to have diameters sufficiently smaller than those of the first and second journal portions $18_1$ and $18_2$, both of which are slidably supported in the guide bore 9.

A coil assembly 23 is housed in the second housing portion 4. The coil assembly 23 comprises a bobbin 24, a coil 25 wound around an outer periphery of the bobbin 24, and a resin mold portion 26 permitting the coil 25 to be embedded in the bobbin 24 in a sealed manner. An annular seal member 27 is interposed between the bobbin 24 and the flange 3a of the first housing portion 3.

A cylindrical stationary core 29 is integrally formed on a rear end wall 4a of the second housing portion 4, so that it is fitted to an inner peripheral surface of the bobbin 24. A seal member 28 is interposed between the bobbin 24 and the stationary core 29 to seal such fitted portions. A rear end of the plunger 19 protrudes into the bobbin 24 and faces a front end face of the stationary core 29.

The plunger 19 is provided with a longitudinal bore 30 extending from a rear end face of the plunger 19 and terminated at a point short of the flange portion 16, and a plurality of transverse bores 31 communicating with an outer peripheral surface of the short shaft portion $17_1$. In this structure, an annular spring seat 32 is formed in the middle of the longitudinal bore 30 to face the stationary core 29.

On the other hand, a support bore 35 is formed through central portions of the entire stationary core 29 and a front half of the third housing portion 5 to communicate with the longitudinal bore 30. An inlet bore 36 having a diameter larger than that of the support bore 35 is provided in a rear half of the third housing portion 5 to lead to the support bore 35. A pipe-shaped retainer 37 is inserted into the support bore 35 so that a return spring 33 for urging the valve body 15 toward the valve seat 13 is supported between the retainer 37 and the spring seat 32. After the depth of the insertion of the retainer 37 is adjusted to regulate the set load of the return spring 33, the retainer 37 is secured to the third housing portion 5 by crimping the outer periphery of the third housing portion 5. Reference numeral 38 designates such a crimped portion. A fuel filter 39 is mounted in the inlet bore 36.

A resin mold portion 41 is formed to extend from the rear end of the second housing portion 4 to the front half of the third housing portion 5 to cover their outer peripheral surfaces, and has a coupler 40 integrally provided at one side thereof. The coupler 40 retains an energizing terminal 42 leading to the coil 25.

A pair of front and rear ring members 46 and 46' made of a synthetic resin are fitted over an outer periphery of the front end of the first housing portion 3 to define an annular groove 45. A seal member 47 is mounted in the annular groove 45. The seal member 47 is adapted to come into close contact with an inner peripheral surface of the first housing portion 3 upon insertion of the first housing portion 3 into the mounting bore 1 in the intake pipe P1 of the engine.

An annular groove 49 is formed around the outer periphery of the rear end of the third housing portion 5, and a seal member 50 is mounted in the annular groove 49. The seal member 50 is adapted to come into close contact with an inner peripheral surface of a gaseous fuel dispensing pipe P2 upon insertion of the third housing portion 5 into the gaseous fuel dispensing pipe P2.

Figure 3:
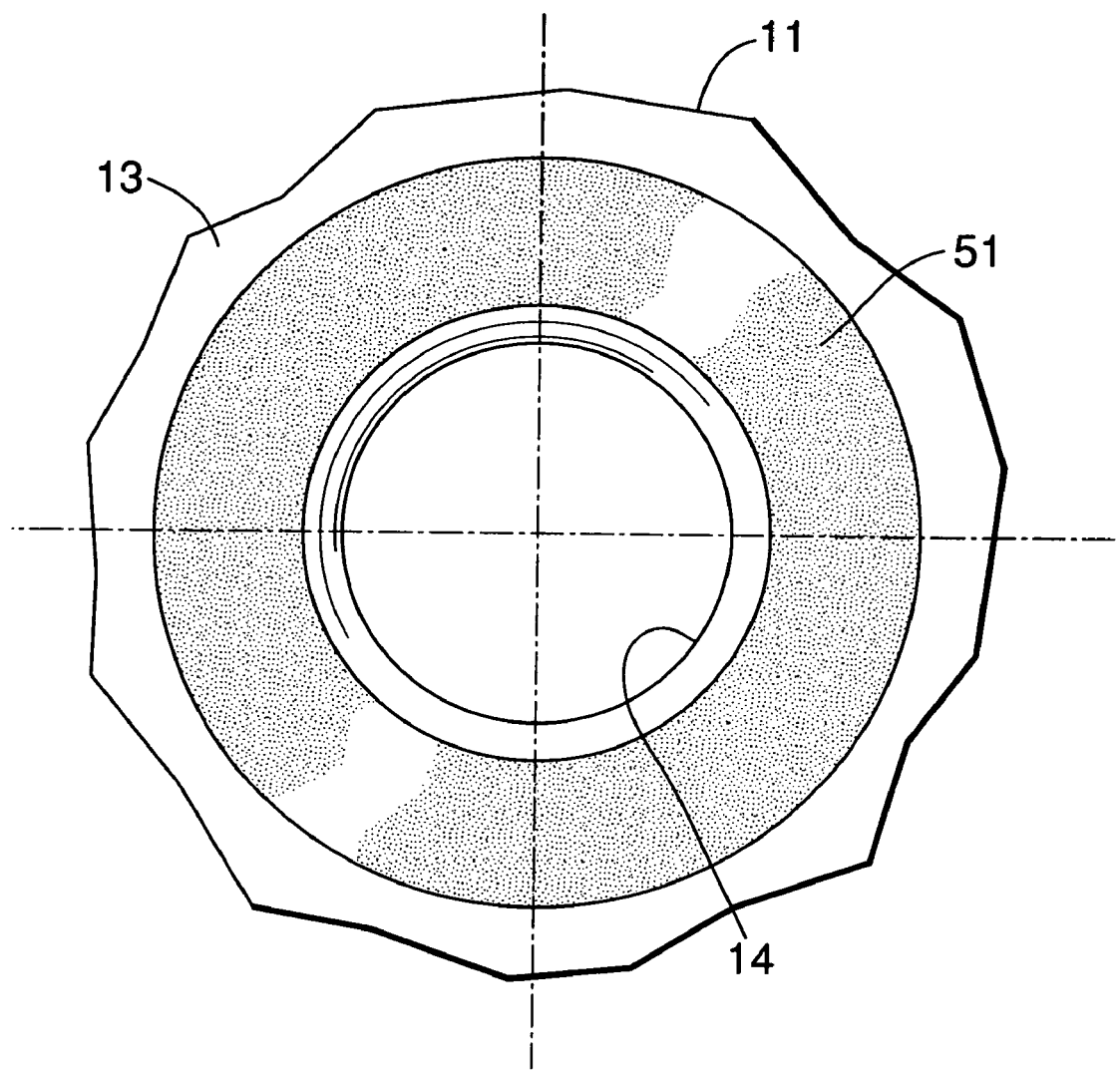
FIG. 3 is a view taken along a line 3-3 in FIG. 2.

As shown in FIGS. 2 and 3, the flat valve seat 13 is coated with a valve seat coating 51 made of a fluorine resin. The nozzle bore 14 is closed by bringing the seating member 20 of the valve body 15 into close contact with the valve seat coating 51.

Figure 4:
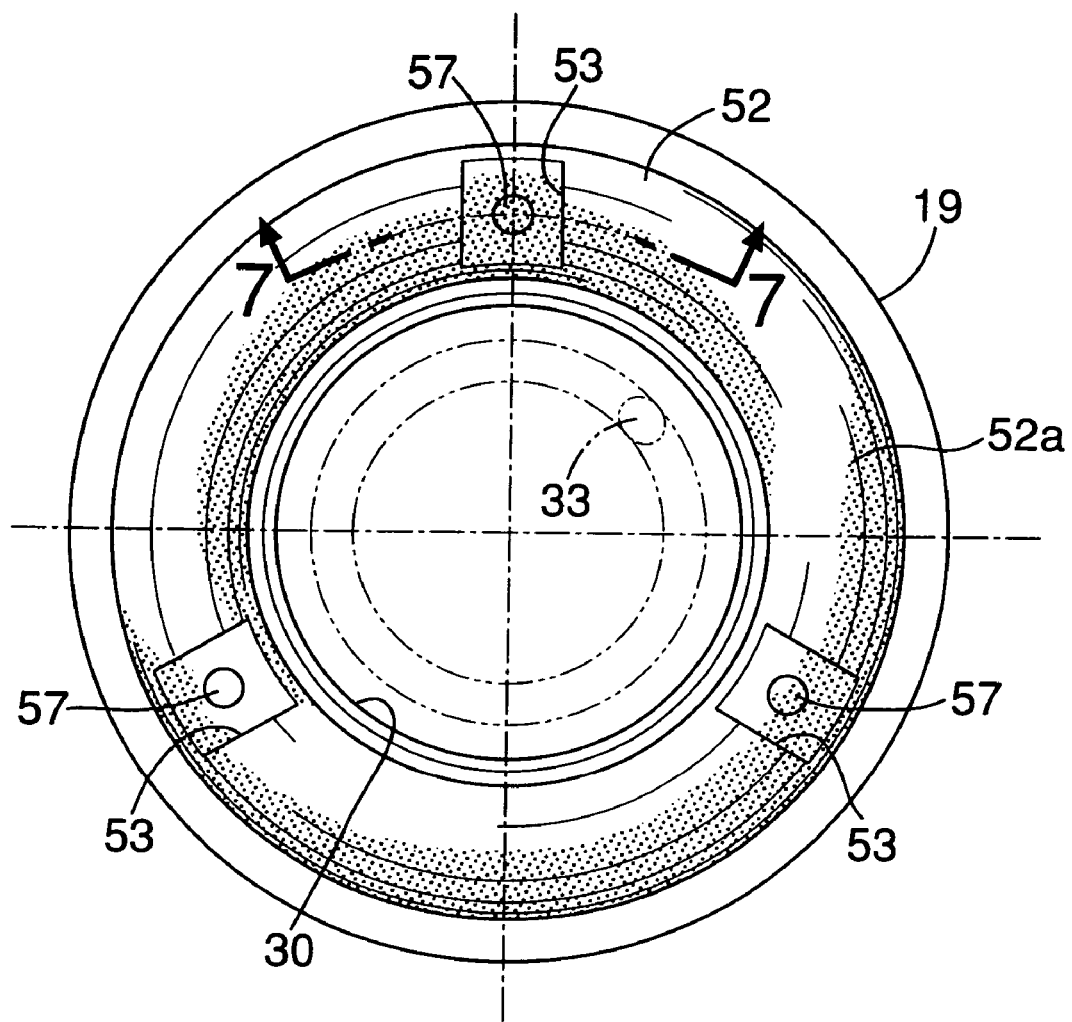
FIG. 4 is a view taken along a line 4-4 in FIG. 2.
Figure 6:
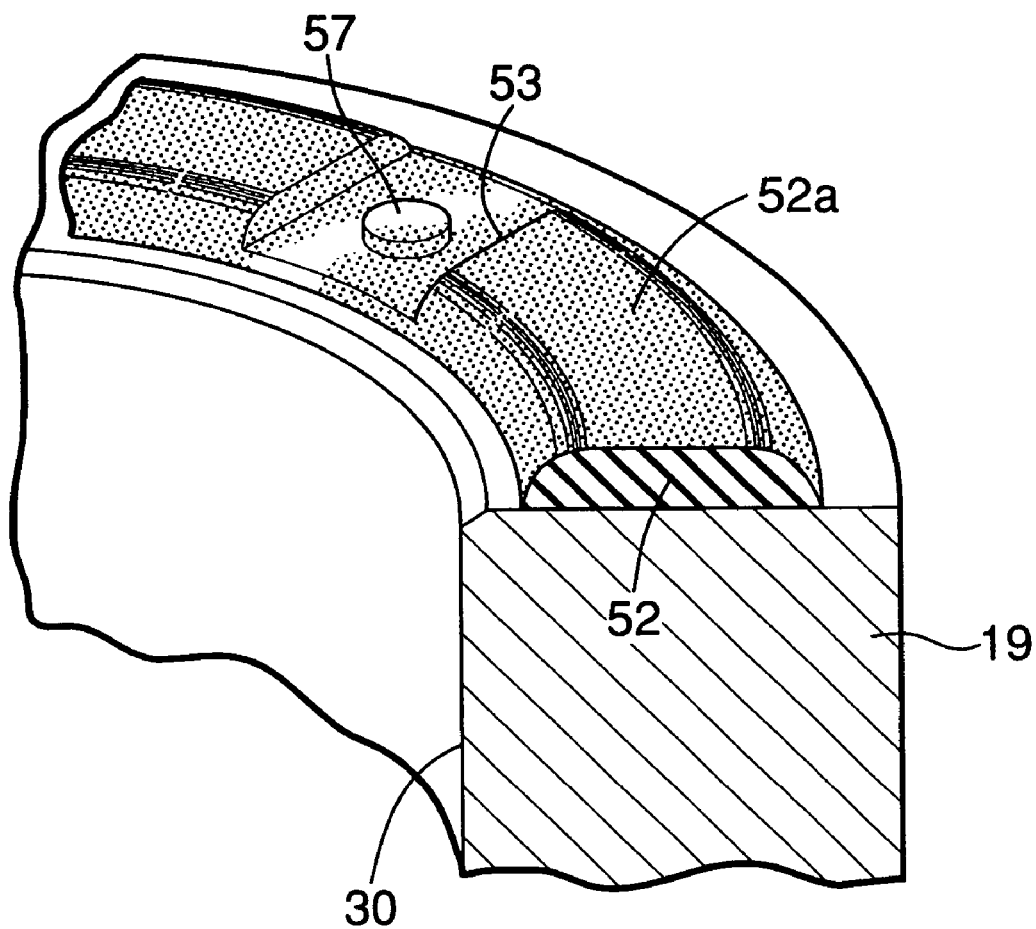
FIG. 6 is a perspective view of essential portions of FIG. 5.

As shown in FIGS. 2, 4 and 6, an annular cushion member 52 made of rubber is bonded by baking to a rear end face of the valve body 15 so as to be opposed to the front end face of the stationary core 29. A plurality of notches 53 are formed in the cushion member 52 and arranged at equal distances in a circumferential direction of the cushion member 52.

Figure 7:
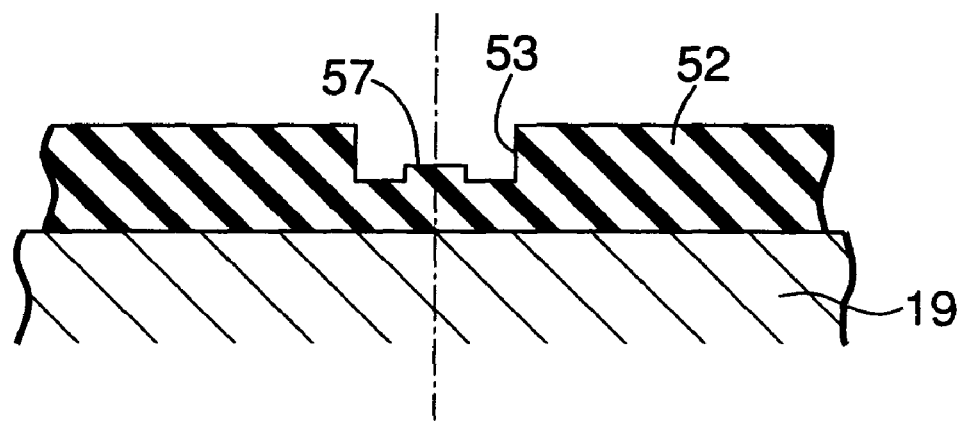
FIG. 7 is an enlarged sectional view taken along a line 7-7 in FIG. 4.
Figure 8:
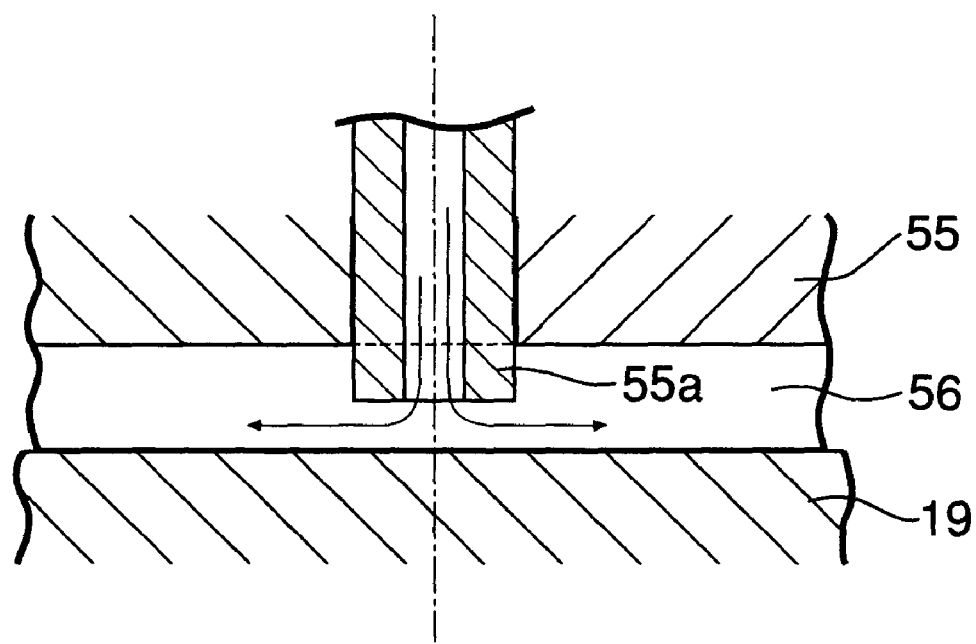
FIG. 8 is a view similar to FIG. 7, but showing a manufacturing process.

To form the cushion member 52 having the notches 53, a die 55 is superposed onto the rear end face of the valve body 15 to define a cavity 56 corresponding to the cushion member 52, as shown in FIGS. 7 and 8. At this time, a plurality of gate portions 55a (one of which is shown in FIG. 8) formed in the die 55 are disposed at locations corresponding to the notches 53. Then, the rubber is charged through the gate portions 55a into the cavity 56 and baked to form the cushion member 52. When the die 55 is released from the valve body 15 after the formation, even if a portion of a runner is left on a bottom surface of each of the notches 53, it doe not obstruct the abutment of the cushion member 52 against the stationary core 52, because it stays in each of the notches 53.

The formation and baking of the seating member 20 and the cushion member 52 to the plunger 19 can be carried out easily and simultaneously by retaining the long shaft portion $17_2$ for the plunger 19 in the die with a jig, leading to the simplification of a manufacture process. Thereafter, surfaces of the seating member 20 and the cushion member 52 are simultaneously subjected to a chemical conversion treatment so that they are formed to be satin finished surfaces 20a and 50a each having an infinite number of very fine irregularities.

Figure 5:
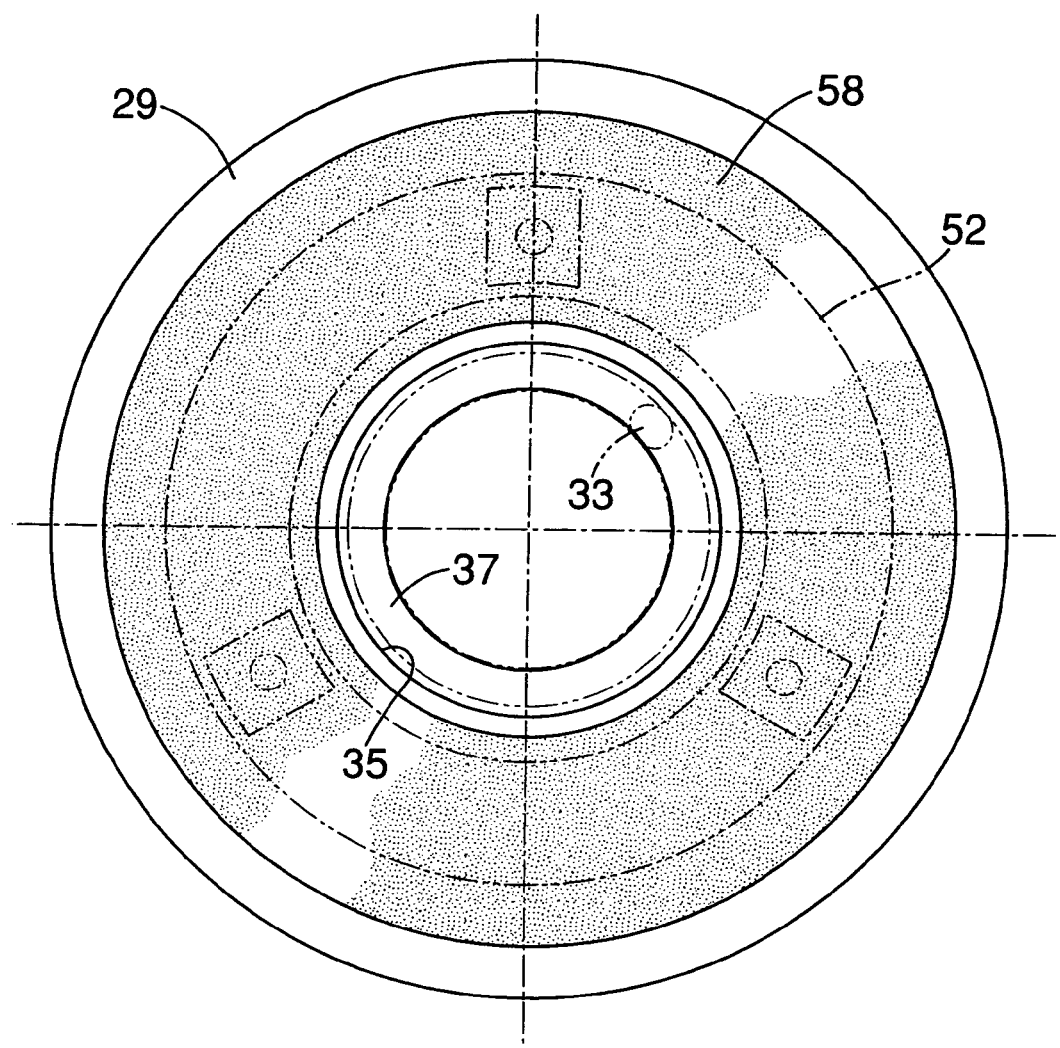
FIG. 5 is a view taken along a line 5-5 in FIG. 2.

Further, as shown in FIGS. 2 and 5, a coating 58 made of a fluorine resin is applied to the front end face of the stationary core 29, so that the limit of the opening of the seating member 20 from the valve seat 13 is defined by the abutment of the cushion member 52 against the coating 58.

In addition, as shown in FIG. 2, a coating 60 made of a fluorine resin is applied to onto either one or both of an outer peripheral surface of each of the first and second journal portions $18_1$ and $18_2$, and an inner peripheral surface of the guide bore 9. In the illustrated embodiment, the coating 60 is applied to only the outer peripheral surface of each of the first and second journal portions $18_1$ and $18_2$.

The operation of the first embodiment will be described below.

In a deexcited state of the coil 25, the valve body 15 is urged forwards by an urging force of the return spring 33, so that the seating member 20 is seated on the valve seat coating 51 of the valve seat 13. In this state, a gaseous fuel fed from a gaseous fuel tank (not shown) to the dispensing pipe P2 is permitted to flow into the inlet bore 36 in the valve housing 2; filtered by the fuel filter 39; then passed through the inside of the pipe-shaped retainer 37, the longitudinal bore 30 and the transverse bores 31 in the valve body 15; and left on standby within the guide bore 9.

When the coil 25 is excited by energization, a magnetic flux generated by the excitation runs sequentially through the stationary core 29, the second housing portion 4, the flange 3a and the valve body 15; the magnetic force of the magnetic flux causes the valve body 15 to be attracted to the stationary core 29 against the set load of the return spring 33; and the rubber cushion member 52 of the valve body 15 is brought into abutment against the front end face of the stationary core 29, thereby defining the limit of the opening of the seating member 20 with respect to the valve seat 13. Thereupon, the gaseous fuel on standby in the guide bore 9 is passed through the valve seat 13, and injected through the nozzle bore 14 into the intake pipe P1 of the engine. The amount of fuel injected is controlled by the duration of opening of the valve body 15.

As mentioned above, a small amount of oil is incorporated in the fuel supplied from the fuel tank to the injection valve I, and hence when the gaseous fuel is passed through the valve seat 13, the oil contained in the fuel is likely to adhere to the valve seat 13. However, in the present invention, because the valve seat 13 is coated with the valve seat coating 51 made of the fluorine resin, the valve seat coating 51 exhibits an oil-repellent effect to prevent the adherence of the oil to the valve seat 13. Therefore, even in a cold season, it is possible to prevent sticking of the seating member 20 to the valve seat 13 due to the adherent oil, thereby providing an improvement in valve-opening response of the valve body 15.

Figure 10:
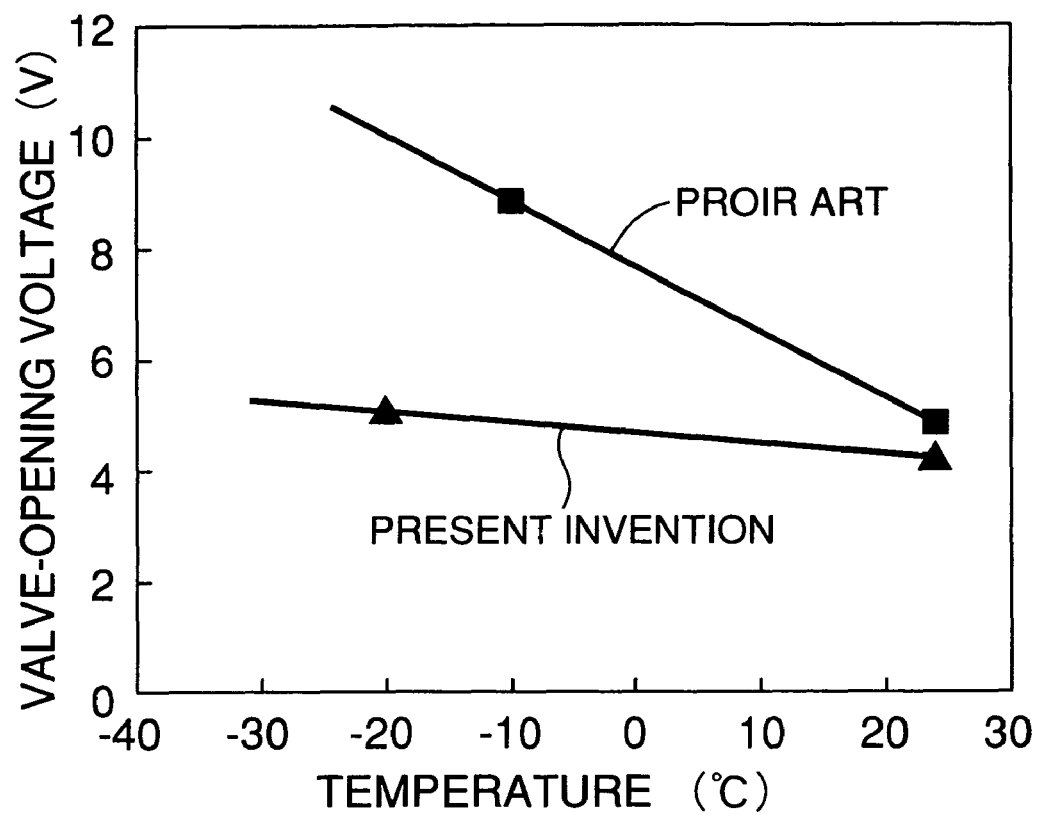
FIG. 10 is a diagram for comparison between performances of the injection valve according to the present invention and a prior art injection valve.

A performance comparison test was actually performed for comparison between the injection valve I according to the present invention including the fluorine resin valve seat coating 51 formed on the valve seat 13 and a prior art injection valve including no valve seat coating, thereby providing a result shown in FIG. 10. More specifically, oil was applied to the valve seats of both the injection valve according to the present invention and the prior art injection valve, and the relationship between the opening load for each of the valve bodies (an opening voltage applied to the coil 25) and the ambient temperature was examined. As a result, in the prior art injection valve, the opening load on the valve body was increased as the temperature drops, where as in the injection valve according to the present invention, the opening load was constantly maintained to be low despite the changing temperature. This proves that the injection valve I according to the present invention is excellent in valve-opening response.

Moreover, the surface of the valve seat coating 51 is extremely smooth, and hence a high-accuracy finishing is not required for the valve seat 13, resulting in a reduction in the manufacturing cost.

In addition, the rubber surface of the seating member 20 is formed to be the satin finished surface 20a, and hence the sucker effect of the valve seat 13 due to the adherent oil can be detracted to more effectively prevent the sticking of the seating member 20 to the valve seat 13, thereby providing a further improvement in valve-opening response of the valve body 15.

As described above, during the opening of the valve body 15, the opening motion of the valve body 15 is stopped in a buffering manner by the abutment of the annular rubber cushion member 52 of the valve body 15 against the front end face of the stationary core 29. Therefore, it is possible to prevent the generation of noise, and to moderate the impact force on the valve body 15 and the stationary core 29 thereby increasing their durability.

Moreover, because the plurality of notches 53 are formed and arranged circumferentially at equal distances in the cushion member 52 and because the surface of the cushion member 52 is formed to be the satin finished surface 52a, the sucker effect of the cushion member 52 due to the adherent oil can be detracted during the opening of the valve body 15 to effectively prevent the sticking of the cushion member 52 to the stationary core 29, thereby providing an improvement in valve-opening response of the valve body 15.

Further, because the fluorine resin coating 58 is applied to the front end face of the stationary core 29 against which the cushion member 52 abuts, the coating 58 exhibits the oil-repellent effect against the oil in the gaseous fuel, thereby providing a further improvement in valve-opening response of the valve body 15.

Because the first and second journal portions $18_1$ and $18_2$ are formed on the plunger 19 of the valve body 15 with the long shaft portion $17_2$ provided therebetween and are slidably supported on the inner peripheral surface of the guide bore 9, the areas of contact of the journal portions $18_1$ and $18_2$ with the inner peripheral surface of the guide bore 9 are remarkably decreased, as compared with a case where a journal portion is formed over the entire length of the plunger 19. Thus, it is possible to decrease sliding clearances between the journal portions $18_1$ and $18_2$ and the inner peripheral surface of the guide bore 9 to stabilize the attitude of the valve body 15, and to prevent the oil in the gaseous fuel from entering the sliding clearances to the utmost. Moreover, because either one or both of the outer peripheral surface of each of the journal portions $18_1$ and $18_2$, and the inner peripheral surface of the guide bore 9 is coated with the fluorine resin coating 60, the oil penetrating into the sliding clearance can be removed by the oil-repellent effect of the coating 60. As a result, it is possible to prevent an increase in resistance to the sliding of the first and second journal portions $18_1$ and $18_2$ due to the penetrating oil, thereby providing an improvement in operating response of the valve body 15.

Figure 9:
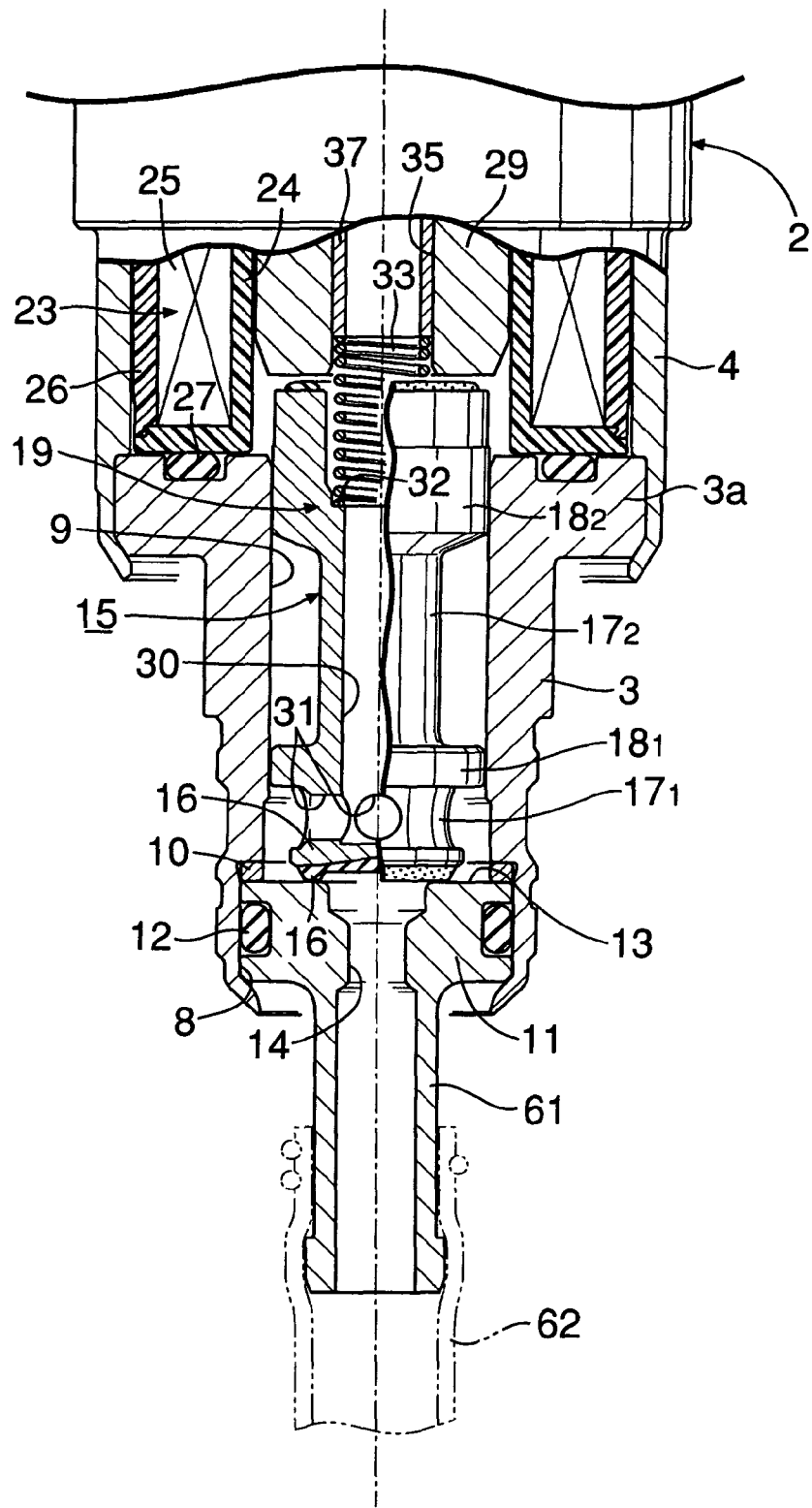
FIG. 9 is a view similar to FIG. 1, but showing a second embodiment of the present invention.

A second embodiment of the present invention will now be described with reference to FIG. 9.

In the second embodiment, a joint pipe 61 is integrally formed at a front end face of a nozzle member 11, so that the interior of the joint pipe 61 communicates with a nozzle bore 14. A gaseous fuel conduit 62 is connected to the joint pipe 61 in order to guide the fuel injected through the nozzle bore 14 to an appropriate portion in an engine. Therefore, unlike the first embodiment, it is not necessary to mount ring members 46 and 46' and a seal member 47 to a first housing portion 3 of a valve housing 2. The other components are the same as those of the first embodiment, and hence components corresponding to those of the first embodiment are designated by the same reference numerals, and the duplicated description is omitted.

Although the embodiments of the present invention have been described in detail, the present invention is not limited to the above-described embodiments, and various modifications in design may be made without departing from the subject matter of the invention.

What is claimed is:

1. A gaseous fuel injection valve, comprising:
   a valve housing;
   a metallic nozzle member which is fixedly mounted at one end of the valve housing and which has a flat valve seat and a nozzle bore passing through a central portion of the valve seat;
   a valve body which is slidably fitted in the valve housing and which is provided at one end face with a rubber seating member for opening and closing the nozzle bore in cooperation with the valve seat, the seating member being connected to the one end face of the valve body by baking;
   a coil supported in the valve housing;
   a stationary core which is connected to the valve housing and disposed inside the coil to be opposed the other end face of the valve body; and
   a return spring mounted under compression between the stationary core and the valve body so as to urge the valve body toward the valve seat, the stationary core attracting the valve body to move the seating member away from the valve seat when the coil is excited,
   wherein a fluorine resin valve seat coating is formed on the valve seat so that the seating member is brought into close contact with the valve seat coating, and wherein an annular rubber cushion member is provided on a surface of the valve body opposed to the stationary core, and a fluorine resin coating is formed on a surface of the stationary core opposed to the valve body so that the cushion member is brought into abutment against the coating when the coil is excited.

2. A gaseous fuel injection valve according to claim 1, wherein the annular rubber cushion member includes a plurality of circumferentially arranged notches at a surface thereof opposed to the stationary core.

3. A gaseous fuel injection valve according to claim 1, wherein surfaces of the seating member and the cushion member of the valve body are formed to be satin finished surfaces.

4. A gaseous fuel injection valve according to claim 1 wherein
   a pair of journal portions are formed at axially opposite ends of the valve body;
   an intermediate portion between the journal portions is formed to be a long shaft portion having a diameter smaller than those of the journal portions; and
   the valve housing is provided with a guide bore in which the journal portions are slidably supported.

5. A gaseous fuel injection valve according to claim 2, wherein
   a pair of journal portions are formed at axially opposite ends of the valve body;
   an intermediate portion between the journal portions is formed to be a long shaft portion having a diameter smaller than those of the journal portions; and
   the valve housing is provided with a guide bore in which the journal portions are slidably supported.

6. A gaseous fuel injection valve according to claim 4, wherein
   a fluorine resin coating is formed on at least one of outer peripheral surface of each of the first and second journal portions, and an inner peripheral surface of the guide bore.

7. A gaseous fuel injection valve according to claim 5, wherein
a fluorine resin coating is formed on at least one of an outer peripheral surface of each of the first and second journal portions, and an inner peripheral surface of the guide bore.

8. A gaseous fuel injection valve, comprising:
a valve housing;
a metallic nozzle member which is fixedly mounted at one end of the valve housing and which has a flat valve seat and a nozzle bore passing through a central portion of the valve seat;
a valve body which is slidably fitted in the valve housing and which is provided at one end face with a rubber seating member for opening and closing the nozzle bore in cooperation with the valve seat;
a coil supported in the valve housing;
a stationary core which is connected to the valve housing and disposed inside the coil to be opposed the other end face of the valve body; and
a return spring mounted under compression between the stationary core and the valve body so as to urge the valve body toward the valve seat, the stationary core attracting the valve body to move the seating member away from the valve seat when the coil is excited,
wherein a fluorine resin valve seat coating is formed on the valve seat so that the seating member is brought into close contact with the valve seat coating, and
wherein an annular rubber cushion member having a plurality of circumferentially arranged notches is baked to a surface of the valve body opposed to the stationary core, and a fluorine resin coating is formed on a surface of the stationary core opposed to the valve body so that the cushion member is brought into abutment against the coating when the coil is excited.

9. A gaseous fuel injection valve according to claim 8, wherein surfaces of the seating member and the cushion member of the valve body are formed to be satin finished surfaces.

10. A gaseous fuel injection valve according to claim 9, wherein
a pair of journal portions are formed at axially opposite ends of the valve body;
an intermediate portion between the journal portions is formed to be a long shaft portion having a diameter smaller than those of the journal portions; and
the valve housing is provided with a guide bore in which the journal portions are slidably supported.

11. A gaseous fuel injection valve according to claim 10, wherein
a fluorine resin coating is formed on at least one of an outer peripheral surface of each of the first and second journal portions, and
an inner peripheral surface of the guide bore.

12. A gaseous fuel injection valve, comprising:
a valve housing;
a metallic nozzle member which is fixedly mounted at one end of the valve housing and which has a flat valve seat and a nozzle bore passing through a central portion of the valve seat;
a valve body which is slidably fitted in the valve housing and which is provided at one end face with a rubber seating member for opening and closing the nozzle bore in cooperation with the valve seat;
a coil supported in the valve housing;
a stationary core which is connected to the valve housing and disposed inside the coil to be opposed the other end face of the valve body; and
a return spring mounted under compression between the stationary core and the valve body so as to urge the valve body toward the valve seat, the stationary core attracting the valve body to move the seating member away from the valve seat when the coil is excited
wherein a fluorine resin valve seat coating is formed on the valve seat so that the seating member is brought into close contact with the valve seat coating, and
wherein a pair of journal portions are formed at axially opposite ends of the valve body;
an intermediate portion between the journal portions is formed to be a long shaft portion having a diameter smaller than those of the journal portions; and
the valve housing is provided with a guide bore in which the journal portions
are slidably supported.

13. A gaseous fuel injection valve according to claim 12, wherein surfaces of the seating member are formed to be satin finished surfaces.

14. A gaseous fuel injection valve according to claim 13, wherein a fluorine resin coating is formed on at least one of outer peripheral surface of each of the first and second journal portions, and an inner peripheral surface of the guide bore.

* * * * *